(12) United States Patent
Wiker et al.

(10) Patent No.: US 8,096,854 B2
(45) Date of Patent: Jan. 17, 2012

(54) MACHINE TOOL AND TOOL, BOTH WITH AN AUTOMATIC BALANCING DEVICE

(75) Inventors: Juergen Wiker, Hangzhou (CN); Joerg Lemmel, Weinstadt (DE); Klaus Kuespert, Leinfelden-Echterdingen (DE); Joerg Maute, Sindelfingen (DE)

(73) Assignee: Robert Bosch GmbH, Stuttgart (DE)

( * ) Notice: Subject to any disclaimer, the term of this patent is extended or adjusted under 35 U.S.C. 154(b) by 575 days.

(21) Appl. No.: 11/933,722

(22) Filed: Nov. 1, 2007

(65) Prior Publication Data
US 2008/0107492 A1 May 8, 2008

(30) Foreign Application Priority Data
Nov. 6, 2006 (DE) .................. 10 2006 052 115

(51) Int. Cl.
*B24B 45/00* (2006.01)
(52) U.S. Cl. ........................ 451/343; 451/344
(58) Field of Classification Search .................. 451/342, 451/343, 344, 358, 359, 352, 353
See application file for complete search history.

(56) References Cited

U.S. PATENT DOCUMENTS

| | | | |
|---|---|---|---|
| 5,839,950 A * | 11/1998 | Johansson Edling et al. | 451/359 |
| 6,464,572 B2 * | 10/2002 | Jansson | 451/344 |
| 6,775,224 B1 | 8/2004 | Soh | |
| 6,826,817 B1 | 12/2004 | Rapp | |
| 6,974,362 B2 * | 12/2005 | Lindell et al. | 451/5 |
| 2002/0056338 A1 * | 5/2002 | Olausson et al. | 74/573 R |
| 2003/0033873 A1 | 2/2003 | Fischer | |
| 2005/0206217 A1 | 9/2005 | Koschel et al. | |
| 2007/0010179 A1 | 1/2007 | Lamprecht | |

FOREIGN PATENT DOCUMENTS

| | | |
|---|---|---|
| DE | 42 39 503 | 5/1994 |
| JP | 11-4558 | 1/1999 |
| WO | 02/08630 | 1/2002 |
| WO | 2005/053903 | 6/2005 |

* cited by examiner

*Primary Examiner* — Robert Rose
(74) *Attorney, Agent, or Firm* — Michael J. Striker

(57) ABSTRACT

A machine tool and a tool include an automatic balancing device, with a first balancing mass located such that it is movable relative to the shaft of the machine tool in all radial directions and in the circumferential direction, that may be started rotating via the rotation of the shaft, and that, during rotation, exerts a force on the shaft in the radial direction.

6 Claims, 3 Drawing Sheets

MACHINE TOOL AND TOOL, BOTH WITH AN AUTOMATIC BALANCING DEVICE

CROSS-REFERENCE TO A RELATED APPLICATION

The invention described and claimed hereinbelow is also described in German Patent Application DE 102006052115.3 filed on Nov. 6, 2006. This German Patent Application, whose subject matter is incorporated here by reference, provides the basis for a claim of priority of invention under 35 U.S.C. 119(a)-(d).

BACKGROUND OF THE INVENTION

The present invention relates to a machine tool, preferably a power tool for rotationally driving a preferably disk-shaped tool, e.g., an angle grinder, a polisher, or a circular saw. The present invention also relates to a tool for a machine tool, preferably a disk-shaped tool.

When working with machine tools, and with power tools in particular, vibrations occur that may be more or less intense. These vibrations result from an imbalance between the masses of the machine tool and the tool, which are rotating at a high rotational speed. The disk-shaped tools used today, such as grinding disks, rough grinding disks, or polishing disks, have relatively great imbalances and/or a high scattering of imbalance due to the manufacturing processes involved, therefore resulting in intense vibrations of the machine tool at high rotational speeds.

These vibrations are transmitted to the operator via the handles and may even result in injury if the machine tool is used for a longer period of time. Standards and working guidelines therefore assign limiting values to vibrations. The limiting values for the maximum permissible imbalance that is permitted according to the standards are too high to meet the operator's increased requirements for comfort. The vibrations resulting from imbalances may also tire the operator quickly and result in increased wear, of the drive and the bearings of the machine tool in particular.

It would be feasible in theory to balance tools or machine tools by installing balancing weights or by removing material in specific areas. A procedure of this type would require a great deal of time and expense, however.

SUMMARY OF THE INVENTION

The object of the present invention, therefore, is to provide a machine tool and a tool with which vibrations resulting from imbalances may be reduced easily and at low cost.

In keeping with these objects and with others which will become apparent hereinafter, one feature of the present invention resides, briefly stated, in a machine tool, comprising a tool; a shaft for rotatably driving said tool; an automatic balancing device with a first balancing mass located such that it is movable relative to said shaft in all radial directions and in a circumferential direction and during rotation exerts a force on said shaft in a radial direction.

Another feature of the present invention resides, briefly stated, in a tool locatable on a shaft of a machine tool, comprising an automatic balancing device with a first balancing mass located such that it is movable relative to the shaft in all radial directions and a circumferential direction and during rotation exerts a force on the shaft in the radial direction.

All combinations of at least two of the features disclosed in the description, the drawing, and/or claims also fall within the framework of the present invention.

The present invention is based on the idea of assigning an automatic balancing device to the machine tool and/or directly to the tool, which is preferably replaceable once it has become worn. According to the present invention, the automatic balancing device includes at least one and preferably at least two balancing masses, which rotate independently of each other and freely around the shaft (spindle) of the machine tool, and which may move relative to the shaft in all radial directions with limitations. At least one balancing mass must be located such that it is also started rotating via the rotation of the shaft.

This may be realized, e.g., via a (preferably small amount of) friction between the at least one balancing mass and a component that is non-rotatably connected with the shaft. Given that the at least one balancing mass is started rotating, a centrifugal force acts on it. This makes it possible for the balancing mass to be oriented automatically, therefore making it possible to automatically balance the machine tool and/or the tool.

With rotating bodies, imbalance occurs when the mass of the rotating bodies is not distributed in a rotationally symmetrical manner, or, in other words, when the axis of rotation does not extend through the center of gravity of the shaft and/or the tool (static imbalance), or when the main axis of inertia of the shaft and/or the tool is tilted relative to the axis of rotation (dynamic imbalance). The at least one balancing mass, which is acted upon with centrifugal force, strives to establish an equilibrium of forces, i.e., to neutralize the transverse force on the shaft created by the imbalance. The at least one balancing mass will orient itself relative to the center of gravity of the rotating shaft and/or the rotating tool such that a neutralizing or balancing force is produced on the shaft that counteracts the imbalance-based force on the shaft that acts in the center of mass of the shaft and/or the tool.

When several neutralizing masses are used, they typically form an angle relative to each other, i.e., they become oriented in different radial directions relative to each other such that a resultant neutralizing force is produced that counteracts the force caused by the imbalance in terms of direction and magnitude. The result is that the center of mass of the total system, which is composed of shaft, tool, and balancing mass(es), is displaced in the direction of the target axis of rotation, i.e., the longitudinal central axis of the shaft, thereby changing the vibrations.

Preferably, the at least one balancing mass—and, in particular, all balancing masses—are located on the machine tool—on the shaft and/or the tool, in particular—such that they are not displaceable—or are displaceable only with limits—in the axial direction. Friction between the shaft or the tool and the balancing mass(es) that is necessary to start the balancing masses rotating may be realized in particular via a (slight) contact pressure in the axial direction, which may be overcome.

According to a preferred refinement of the present invention, it is provided that the balancing masses are designed as annular disks. They are provided with a preferably central opening, which preferably accommodates the shaft with play, thereby allowing relative motion in all radial directions. The circumferential edge of the opening thereby simultaneously limits the maximum deflection of the balancing mass in the radial direction. Instead of an annular disk, a circular plate—through which the shaft does not pass—may also be used as the balancing mass. With a design of this type, it must be ensured, however, that the maximum deflection is limited in the circumferential direction, e.g., via a circumferential wall (a balancing mass housing). The circumferential wall accommodates the disk radially inwardly with radial play, thereby enabling the disk—which is preferably located on the end face of the tool—to move freely radially within the circumferential wall.

In addition or as an alternative thereto, at least one of the balancing masses may be designed as a quantity of fluid and/or granulate. The maximum radial deflection of the quantity of fluid and/or the quantity of granulate must also be limited, however, preferably by locating the quantity of fluid and/or granulate in a container or housing that is started rotating when the shaft rotates. To ensure radial motion in all radial directions, it must be ensured that the volume of the container is greater than the volume of the quantity of fluid and/or granulate.

In addition or as an alternative thereto, at least one of the balancing masses may be designed as a ball that is positioned such that it is movable in all radial directions, e.g., by the fact that the ball is accommodated in a cage or container that simultaneously limits the maximum radial deflection of the ball when the shaft rotates. Preferably, at least two balls are accommodated in a cage or container such as this, which may be connected, e.g., directly to the shaft, a component that is non-rotatably connected with the shaft, or with the tool.

When the automatic balancing device is located on the machine tool, the balancing device may be located, e.g., directly on the shaft, or it may be integrated in the shaft. In addition or as an alternative thereto, it is feasible to locate a balancing device on a fixing flange for fixing a tool in position, and/or on or in a fastening nut.

When the at least one balancing mass—which is displaceable in all radial directions—is located on a tool, it is preferably located on at least one end face of the tool, and it must be located such that it is movable in the direction of rotation and in the radial direction relative to the tool, which may be started rotating using the shaft of the machine tool. Preferably, the freedom of movement of the balancing mass is limited in the axial direction at the least.

The present invention also relates to the use of at least one balancing mass as an automatic balancing device for a machine tool or a tool.

The novel features which are considered as characteristic for the present invention are set forth in particular in the appended claims. The invention itself, however, both as to its construction and its method of operation, together with additional objects and advantages thereof, will be best understood from the following description of specific embodiments when read in connection with the accompanying drawings.

DESCRIPTION OF THE PREFERRED EMBODIMENTS

All of the figures show sections of an angle grinder as a machine tool 1 with a tool 2 designed as a grinding disk. The electrical drive of the shaft is not shown, for clarity.

Figure 1:
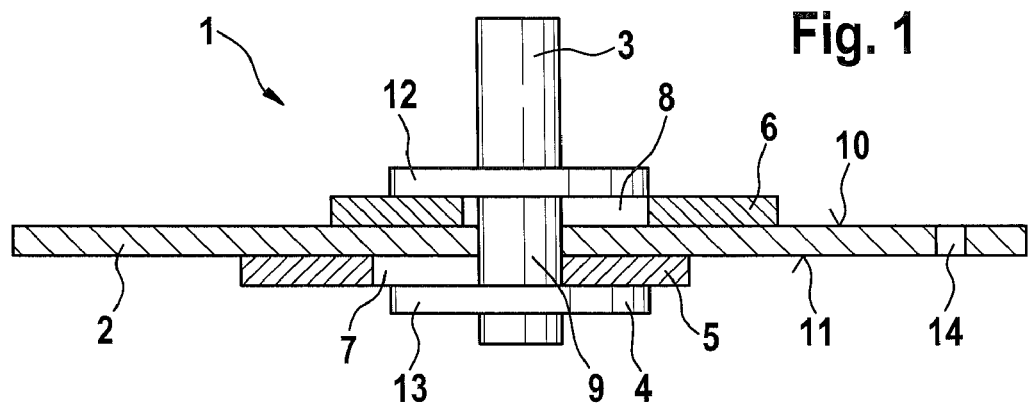
FIG. 1: A schematic depiction of a shaft of a machine tool with a tool installed, and with an automatic balancing device that includes two annular disks located on the side of the tool.

Tool 2 is non-rotatably located on a rotatable shaft 3 (spindle). Fastening means provided for this purpose are not shown in FIG. 1, for clarity. Part of tool 2 is an automatic balancing device 4 with a first balancing mass 5 and a second balancing mass 6. Each balancing mass 5, 6 includes a central, circular opening 7, 8, through which shaft 3 passes with a large amount of radial play. A sleeve-shaped hub 9 of balancing device 4 is non-rotatably mounted on shaft 3, on which centrifugal forces act directly when balancing masses 5, 6 rotate. The centrifugal forces are transferred directly to shaft 3.

Balancing masses 5, 6 are located on both end faces 10, 11 of tool 2, and they bear directly against it. To prevent axial displacement of balancing masses 5, 6, fastening disks 12, 13 designed as single pieces with hub 9 are provided, so that each balancing mass 5, 6 is accommodated between an end face 10, 11 of tool 2 and a fastening disk 12, 13 diametrically opposed thereto in the axial direction. Slight frictional contact exists between balancing masses 5, 6 and the components adjacent to them in the axial direction, so that balancing masses 5, 6 are started rotating when shaft 3 starts rotating. As a result, balancing masses 5, 6 are moved radially outwardly and bear—via the circumferential edges of their openings 7, 8—centrally direct against hub 9 and exert forces on hub 9 in the radial direction. The resultant neutralizing force counteracts a force on shaft 3 caused by an imbalance 14 in tool 2, so that the center of mass of the total system coincides at least approximately with the axis of rotation of shaft 3, i.e., it is displaced, thereby reducing vibrations. In other words, balancing masses 5, 6 become part of the rotating total system, the center of mass of which is displaced via the orientation of balancing mass 5, 6.

Figure 2:
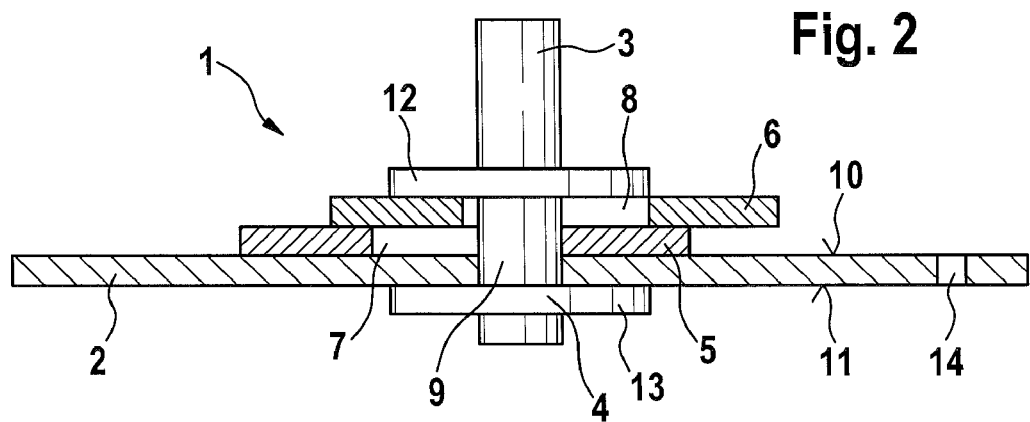
FIG. 2: A schematic depiction of an alternative balancing device, with which both balancing masses—which are designed as annular disks—are located directly adjacent to each other on the end face of the tool that is opposite to the free end of the shaft.

In the exemplary embodiment shown in FIG. 2, balancing masses 5, 6 are located directly adjacent to end face 10 of tool 2 that is opposite to the free end of shaft 3. Balancing masses 5, 6 are prevented from moving in the axial direction by limiting disk 12 and end face 10 of tool 2, which, in turn, bears via end face 11 against outer limiting disk 13. In this exemplary embodiment as well, balancing masses 5, 6 may move relative to shaft 3 in the radial direction and in the rotational and circumferential direction, since hub 9 is accommodated in openings 7, 8 of balancing masses 5, 6 with a large amount of play.

Figure 3:
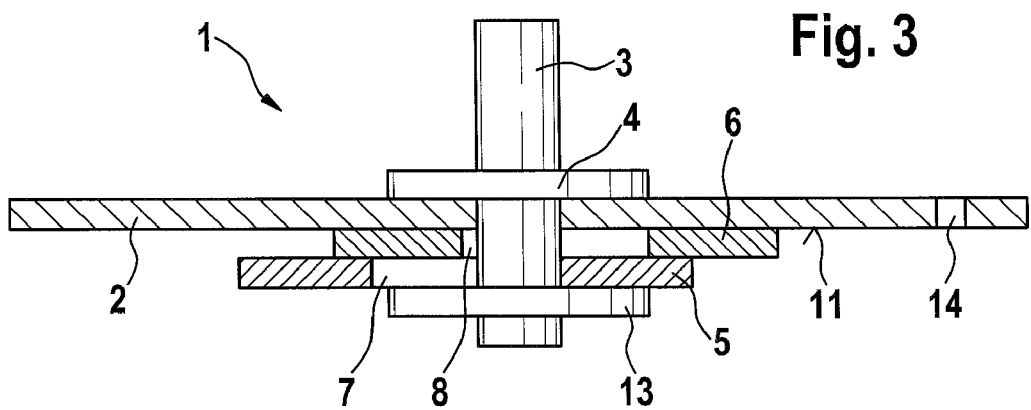
FIG. 3: A schematic depiction of an alternative embodiment of an automatic balancing device, which is similar to the embodiment shown in FIG. 2, with which the balancing masses are located on the end face of the tool that faces the free end of the shaft.

The exemplary embodiment shown in FIG. 3 is essentially the same as the exemplary embodiment in FIG. 2, with the only difference being that the two balancing masses 5, 6 are located on end face 11 of tool 2 facing the free end of shaft 3, which is driven by an electric motor. Outer balancing mass 5 bears against outer limiting disk 13, and inner balancing mass 6 bears against end face 11 of tool 2.

Figure 4:
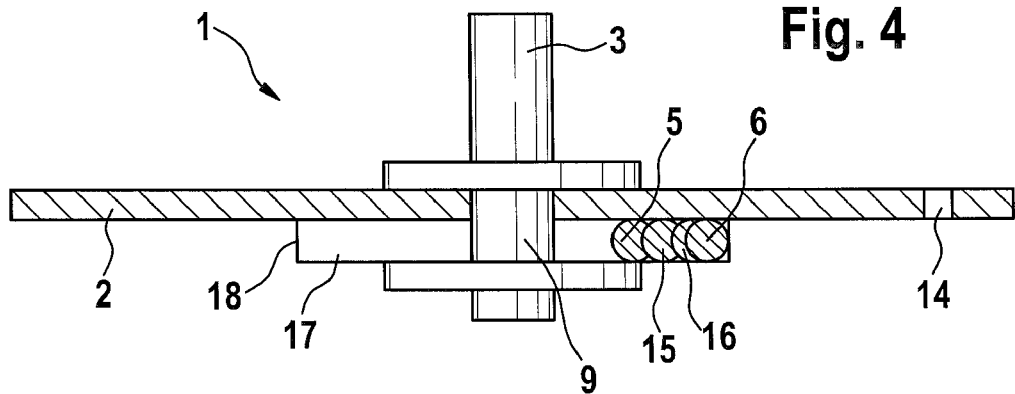
FIG. 4: A schematic depiction of an alternative embodiment of an automatic balancing device, with which the balancing masses are designed as balls.

In the exemplary embodiment shown in FIG. 4, automatic balancing device 4 is also part of replaceable tool 2, but balancing masses 5, 6, 15, 16 are not designed as annular disks, but as balls that are accommodated in a cylindrical cage 17 with an outer circumferential wall 18. Outer circumferential wall 18 limits the movement of balancing masses 5, 6, 15, 16 in the radial direction. Spherical balancing masses 5, 6, 15, 16 are free to move inside cage 17. Shaft 3 and hub 9 pass through cage 17. When the total system rotates, spherical balancing masses 5, 6, 15, 16 bear against circumferential wall 18 and counteract the transverse force caused by the imbalance.

Figure 5:
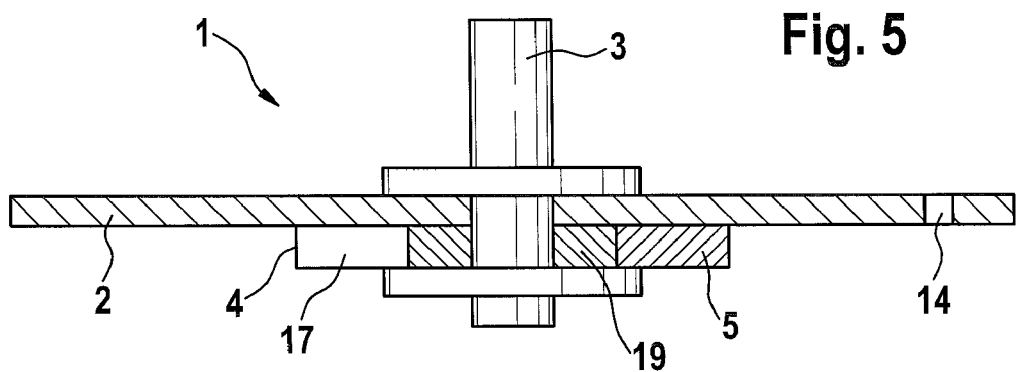
FIG. 5: A schematic depiction of a further embodiment of an automatic balancing device, with which the sole balancing mass is designed as a quantity of fluid.

The basic design of the exemplary embodiment shown in FIG. 5 is similar to that of the exemplary embodiment shown in FIG. 4, with the difference that a balancing mass 5 designed as a quantity of fluid is provided inside annular cage 17 instead of spherical balancing masses 5, 6, 15, 16. The volume of the fluid is less than the volume of cage 17. In the exemplary embodiment shown in FIG. 5, the volume of cage 17 is smaller than the volume of the cage shown in the exemplary embodiment in FIG. 4, which is realized as a central filler ring 19.

Figure 6:
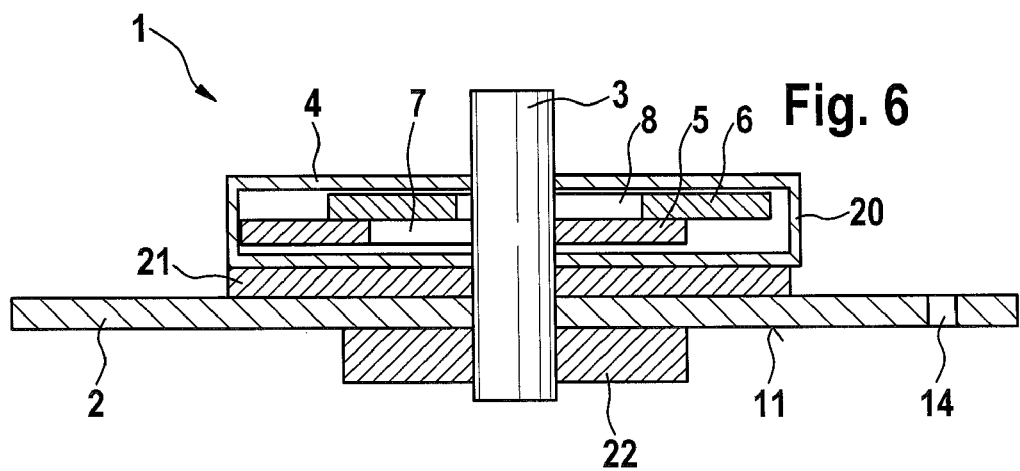
FIG. 6: A schematic depiction of an alternative embodiment of an automatic balancing device, with which the balancing device is located directly on the shaft.

In the exemplary embodiment shown in FIG. 6, automatic balancing device 4 is not part of tool 2, but rather is part of machine tool 1. Automatic balancing device 4 includes two circular balancing masses 5, 6, each of which includes a central circular opening 7, 8, in which shaft 3 is accommodated with radial play. Balancing masses 5, 6, in turn, are located in a protective housing 20, which is non-rotatably connected with shaft 3. Protective housing 20 bears directly against a fixing flange 21 used to fix tool 2 in position. A locknut 22 for fixing tool 2 in position on fixing flange 21 is provided on end face 11 of tool 2 that is diametrically opposed to fixing flange 21. As shown in FIG. 6, protective housing 20 limits the motion of balancing masses 5, 6 in the axial direction, and a slight amount of axial motion is possible. As soon as one of the balancing masses 5, 6 comes to bear against a radial wall of protective housing 20, protective housing 20 is started rotating when the shaft rotates, thereby forcing it radially outwardly.

Figure 7:
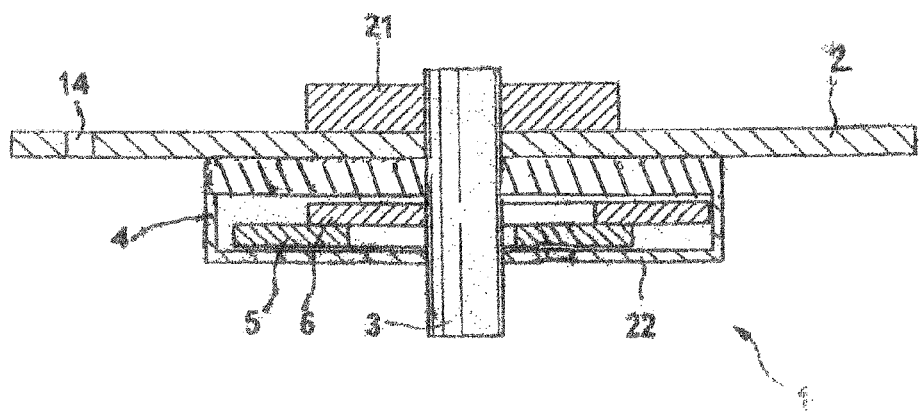
FIG. 7: A schematic depiction of an alternative balancing device, with which the balancing device is integrated in the locknut used to fix the tool in position.

In the exemplary embodiment shown in FIG. 7, the automatic balancing device is also part of machine tool 1. The two disk-shaped balancing masses 5, 6 are accommodated within locknut 22 and are secured in the axial direction by locknut 22.

Figure 8:
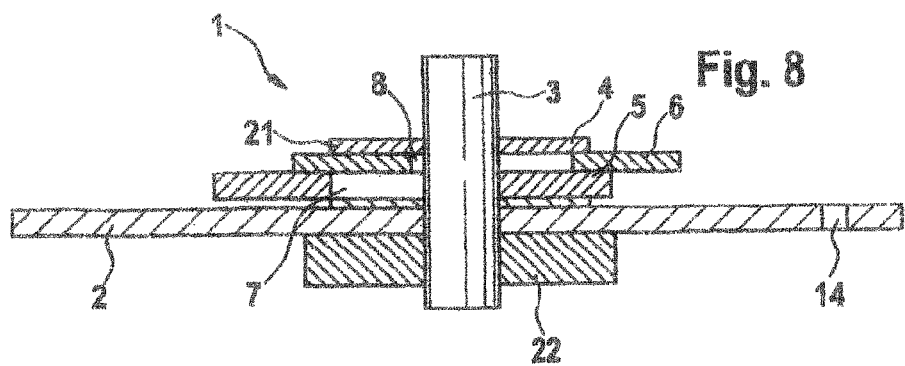
FIG. 8: A schematic depiction of a further embodiment of a balancing device, with which the automatic balancing device is integrated in fixing flange used to fix the tool in position.

The exemplary embodiment shown in FIG. 8 essentially corresponds to the exemplary embodiment shown in FIG. 7, with the difference that balancing device 4 is integrated in fixing flange 21.

Figure 9:
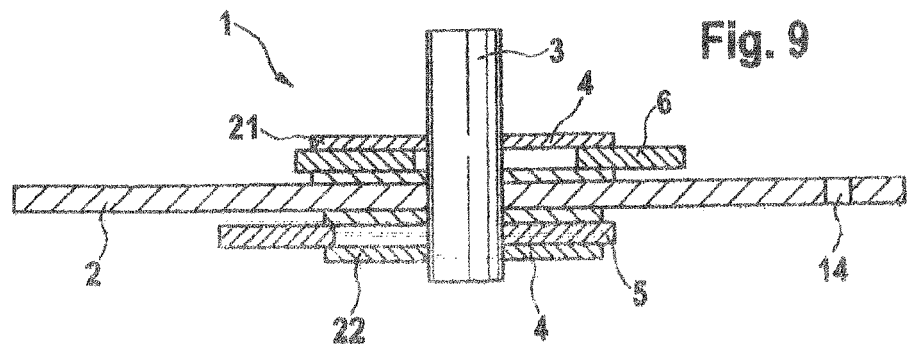
FIG. 9: A schematic depiction of a further embodiment of an automatic balancing device, with which a balancing device—which is designed as an annular disk—is located in the fixing flange and in the fastening nut used to fix the tool in position.

In the exemplary embodiment shown in FIG. 9, disk-shaped balancing masses 5, 6 are divided between locknut 22 and fixing flange 21, thereby making both of them part of automatic balancing device 4.

It will be understood that each of the elements described above, or two or more together, may also find a useful application in other types of constructions differing from the type described above.

While the invention has been illustrated and described as embodied in a machine tool and tool, both with an automatic balancing device, it is not intended to be limited to the details shown, since various modifications and structural changes may be made without departing in any way from the spirit of the present invention.

Without further analysis, the foregoing will so fully reveal the gist of the present invention that others can, be applying current knowledge, readily adapt it for various applications without omitting features that, from the standpoint of prior art, fairly constitute essential characteristics of the generic or specific aspects of this invention.

What is claimed as new and desired to be protected by Letters Patent is set forth in the appended claims.

The invention claimed is:

1. A machine tool, comprising a tool; a shaft for rotatably driving said tool; an automatic balancing device with a first balancing mass located so that said first balancing mass is movable relative to said shaft in all radial directions and in a circumferential direction and during rotation exerts a force on said shaft in a radial direction; and a fastening nut,
   wherein said balancing device is a part of said fastening nut.

2. A machine tool as defined in claim 1; and further comprising a second balancing mass which is movable relative to said shaft in all radial directions and in the circumferential direction and during rotation exerts a force on said shaft in said radial direction.

3. A machine tool as defined in claim 2, wherein at least one of said balancing masses is configured as an annular disk.

4. A machine tool as defined in claim 2, wherein at least one of said balancing masses is accommodated in a container and is at least one of a quantity of a fluid and a quantity of a granulate, and wherein a volume of said container is greater than a volume of said at least one of said balancing masses accommodated in said container.

5. A machine tool as defined in claim 2, wherein at least one of said balancing masses is configured as a ball.

6. A machine tool as defined in claim 1, where said balancing device is located directly on said shaft.

\* \* \* \* \*